United States Patent
Traub et al.

(10) Patent No.: US 10,316,964 B2
(45) Date of Patent: Jun. 11, 2019

(54) METHOD FOR CONTROLLING A CONTINUOUSLY VARIABLE TRANSMISSION FOR A VEHICLE

(71) Applicant: ZF Friedrichshafen AG, Friedrichshafen (DE)

(72) Inventors: Stefan Traub, Friedrichshafen (DE); Jan-Frederik Kuhn, Friedrichshafen (DE); Martin Laupheimer, Ravensburg (DE); Matthias Madlener, Hohentengen (DE); Marcus Hiemer, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/820,666

(22) Filed: Nov. 22, 2017

(65) Prior Publication Data
US 2018/0149265 A1   May 31, 2018

(30) Foreign Application Priority Data
Nov. 30, 2016  (DE) .......................... 10 2016 223 873

(51) Int. Cl.
*F16H 61/12*  (2010.01)

(52) U.S. Cl.
CPC ..... *F16H 61/12* (2013.01); *F16H 2061/1212* (2013.01); *F16H 2061/1232* (2013.01); *F16H 2061/1264* (2013.01)

(58) Field of Classification Search
CPC ............. F16H 61/12; F16H 2061/1212; F16H 2061/1232; F16H 2061/1264; F16D 48/06
See application file for complete search history.

(56) References Cited

U.S. PATENT DOCUMENTS 6,338,247 B1 *  1/2002  Drin ........................ B60T 1/093
                                                              60/466
6,581,488 B2   6/2003  Miyazaki et al.
(Continued)

FOREIGN PATENT DOCUMENTS

| DE | 10303206 A1 | 7/2004 |
| DE | 60126384 T2 | 10/2007 |
| DE | 102015100766 A1 | 7/2015 |

OTHER PUBLICATIONS

German Search Report issued in corresponding German Patent Application No. 10 2016 223 873.6 dated Sep. 18, 2017.

*Primary Examiner* — Edwin A Young
(74) *Attorney, Agent, or Firm* — Davis & Bujold PLLC; Michael J. Bujold

(57) ABSTRACT

A method of controlling a continuously variable transmission for a vehicle. The continuously variable transmission has a hydrostat with a position-regulating valve and is designed to co-operate in driving connection with a drive input shaft and a drive output shaft such that when the position-regulating valve is energized, the hydrostat is adjusted to accelerate the vehicle. The method includes monitoring the energization of the position-regulating valve cyclically by a safety function. The safety function is provided in order to recognize undesired energization of the position-regulating valve that leads to unwanted acceleration of the vehicle, and then to separate the transmission at least from the drive output shaft so as to prevent unwanted acceleration of the vehicle. The safety function is triggered at least when a limit value for the energization of the position-regulating valve is exceeded.

16 Claims, 2 Drawing Sheets

(56) References Cited

U.S. PATENT DOCUMENTS

| | | | |
|---|---|---|---|
| 7,841,442 B2 | 11/2010 | Berg et al. | |
| 9,470,310 B2 | 10/2016 | Kinoshita | |
| 2003/0013575 A1* | 1/2003 | Sprinkle | B60K 31/04 477/120 |
| 2003/0226354 A1* | 12/2003 | Nippert | F15B 1/033 60/454 |
| 2015/0033728 A1* | 2/2015 | Glaz | F04D 19/002 60/445 |

* cited by examiner

METHOD FOR CONTROLLING A CONTINUOUSLY VARIABLE TRANSMISSION FOR A VEHICLE

This application claims priority from German patent application serial no. 10 2016 223 873.6 filed Nov. 30, 2016.

FIELD OF THE INVENTION

The invention concerns a method for controlling a continuously variable transmission for a vehicle, wherein the continuously variable transmission comprises a hydrostat with a position-regulating valve.

BACKGROUND OF THE INVENTION

In a continuously variable drive with a continuously variable transmission, when the drive-train is closed an erroneous application of a control current of the position-regulating valve on the hydrostat can result in an undesired acceleration of the vehicle from rest or during driving. The position-regulating valve is provided in order to adjust the continuously variable transmission ratio. Due to the very high adjustment speeds of the hydrostat this acceleration takes place almost immediately.

SUMMARY OF THE INVENTION

The purpose of the present invention is to provide a method for controlling a continuously variable transmission, which quickly recognizes that an erroneous current has been applied to the position-regulating valve and avoids an undesired acceleration of the vehicle. In particular the erroneous application of current that leads to an undesired acceleration should be distinguished from a desired acceleration.

This objective is achieved by the object of the independent claim(s). Preferred embodiments are the object of the dependent claims.

The method according to the invention for controlling a continuously variable transmission for a vehicle is designed for a continuously variable transmission with a hydrostat, such that the hydrostat comprises a position-regulating valve. The continuously variable transmission acts, in terms of drive input technology, with a drive input shaft and in drive output technology together with a drive output shaft. When the position-regulating valve is energized, the hydrostat is adjusted so as to accelerate the vehicle, and the energization of the position-regulating valve is monitored cyclically by a safety function. In this case, the safety function is provided in order to recognize undesired energization of the position-regulating valve that can lead to unwanted acceleration of the vehicle in order to, then, separate the transmission at least from the drive output shaft and thereby prevent undesired acceleration of the vehicle. In this case the safety function is triggered when at least one limit value for the energization of the position-regulating valve is exceeded.

The at least one limit value for the energization of the position-regulating valve, provided in order to trigger the safety function, depends on vehicle and transmission parameters and on numerous operating parameters of the continuously variable transmission.

The continuously variable transmission is a mechanically power-branched transmission. In particular, the continuously variable transmission has up to three driving ranges such that the driving ranges are selected or engaged by means of so-termed range clutches. By means of a so-termed driving direction clutch, the continuously variable transmission is connected to a drive engine, in particular a diesel engine. By virtue of a planetary gearset, which is part of the continuously variable transmission, the hydrostat is connected into the power flow in the transmission. When the driving direction clutch and the first range clutch are both closed, the vehicle starts off by pivoting the hydrostat, this pivoting of the hydrostat being brought about by means of the position-regulating valve arranged in the hydrostat. Moreover, in the driving range concerned, acceleration of the vehicle is brought about by pivoting the hydrostat and thus by energizing the position-regulating valve.

For the cyclical monitoring of the energization of the position-regulating valve, in particular the current size and/or the voltage applied to the position-regulating valve are monitored. In particular, a change of the current and/or voltage can also be monitored. Preferably, the cyclical monitoring of the energization of the position-regulating valve takes place at time intervals of 10 milliseconds. During this, a pre-evaluation of the energization can be carried out, whereby only those energizations of the position-regulating valve are selected which can lead to an acceleration of the vehicle. In that way, for example, energizations can be disregarded which would compensate an undesired acceleration by virtue of an inertia of the drive-train.

In a preferred example embodiment the safety function is used to monitor the unwanted starting off of the vehicle, this unwanted start monitoring being activated when a rotational speed of the drive output shaft is slower than a variably adjustable limit value and the drive input shaft is force-connected to the drive output shaft. Thus, start monitoring is provided in order to prevent an unwanted acceleration of the vehicle from rest. Consequently the start monitoring is not permanently active but is only activated when the rotational speed of the drive output shaft is slower than the variably adjustable limit value and the drive input shaft is force-connected to the drive output shaft by way of the continuously variable transmission. Accordingly, both the driving direction clutch and the first range clutch must be closed.

Preferably, the start monitoring is deactivated when a limit value for an accelerator pedal position is exceeded. The limit value for the accelerator pedal position gives information about whether the energization of the position-regulating valve is intended. By the input of a drive demand, for example by actuating the accelerator pedal, the vehicle is accelerated since among other things the position-regulating valve is energized. If the accelerator pedal is not actuated, the position-regulating valve too should not be energized. To differentiate between desired and undesired acceleration, the limit value for the accelerator pedal position can preferably be set at 5%. In other words the accelerator pedal must be actuated by at least 5% in order to deactivate the start monitoring. In this way the quality of the safety function and hence the performance of the drive-train are improved.

In particular, before triggering the safety function a debouncing time of two to three cycles is provided, in order to further improve the quality of the safety function. Thus, the conditions required for triggering the safety function have to be verified over two to three cycles.

According to a preferred example embodiment the safety function is triggered when a maximum current value for the energizing of the position-regulating valve is exceeded. Thus, the following conditions have to be fulfilled simultaneously for the safety function to be triggered: the rotational speed of the drive output shaft is slower than a variably adjustable limit value, the drive input shaft and the drive output shaft are force-connected, the current accelerator pedal position is below the limit value for the accelerator pedal position, and the current that is energizing the position-regulating valve at the time is above the maximum current value for energizing the position-regulating valve.

In a further preferred example embodiment the safety function is triggered when a maximum differential current value for the energization of the position-regulating valve is exceeded. Thus, the following conditions have to be fulfilled simultaneously for the safety function to be triggered: the rotational speed of the drive output shaft is slower than a variably adjustable limit value, the drive input shaft and the drive output shaft are force-connected, the current accelerator pedal position is below the limit value for the accelerator pedal position, and the maximum differential current value for the energization of the position-regulating valve has been exceeded. The differential current value is understood to mean the change of the current value over a given time or over at least two cycles.

The invention embodies the technical principle that undesired starting of the vehicle is recognized when a limit value for the energization of the position-regulating valve is exceeded without reaching the maximum differential current value, and then a counter is started and the safety function is triggered when the counter has run down and the limit value for the current in the position-regulating valve is still exceeded. In this context the counter describes, for example, a time interval which is to pass. In other words, at the time-point when the limit value for the energization of the position-regulating valve is exceeded, which is below the maximum limit value for the energizing of the position-regulating valve, a counter is started. This case occurs if the energization of the position-regulating valve increases not suddenly but slowly, so that the maximum differential current value is not reached. Thereby an acceleration of the vehicle takes place later.

The safety function is only triggered when the counter has run down and the limit value for the current in the position-regulating valve is still exceeded. Thus, the counter provides a delay time. While the delay time is passing, preferably other conditions such as the accelerator pedal position are evaluated. If the accelerator pedal position is below the limit value for the accelerator pedal position, further conditions are referred to, which are provided for recognizing an undesired starting. In particular only conditions are referred to which allow the conclusion that the drive output rotational speed has changed, since otherwise no acceleration is taking place.

Movement at the drive output shaft can be recognized by various means. For example, a drive output rotational speed indicator can be evaluated. From a lower threshold onward the drive output rotational speed indicator reliably recognizes movement of the drive output shaft. The lower threshold is one revolution of the drive output shaft per minute. To enable movement of the drive output shaft to be recognized even earlier, in addition to or alternatively a sensor signal for detecting the displacement volume of the transmission can be evaluated. Moreover, it is also conceivable to use further, internal rotational speed indicators for recognizing movement of the drive output shaft, these indicators detecting a voltage change when the drive output shaft is in motion.

If the monitored limit values are exceeded and the counter has run down, the safety function is triggered. In contrast, the recognition of unwanted starting is deactivated when the energization of the position-regulating valve is below the limit value for the position-regulating valve energization and the counter has not yet run down.

According to a preferred embodiment, the safety function for monitoring undesired acceleration of the vehicle is used while driving, in such manner that acceleration monitoring comprises an evaluation function that can be parameterized, such that a change of current from the preceding cycle to the present cycle and a sum of the changes of current in a number of elapsed cycles are provided as input magnitudes. In other words, the check whether an unwanted current change in the position-regulating valve has taken place is carried out by monitoring the change of current in consecutive cycles, preferably repeated every 10 milliseconds. An average permissible current change is established. If this average permissible current change is exceeded, the safety function is triggered.

In particular, the acceleration monitoring is only active when either a force connection exists between the drive input shaft and the drive output shaft, so that both the driving direction clutch and the range clutch are closed, or when the range clutch is closed so that a force connection only exists between the transmission and the drive output shaft, but at the same time the internal rotational speeds of the transmission are above a limit value. If the internal rotational speeds of the transmission are above the limit value, then if the hydrostat is energized, undesired acceleration can occur due to the inertia of the rotating masses in the transmission.

The invention embodies the technical principle that the evaluation function capable of being parameterized is generated from numerous vehicle data. In particular, the average permissible change of current depends on the number of cycles and decreases with increasing number of cycles.

BRIEF DESCRIPTION OF THE DRAWINGS

Below, example embodiments of the invention are explained in greater detail with reference to the drawings, which show.

DETAILED DESCRIPTION OF THE DRAWINGS

Figure 1:
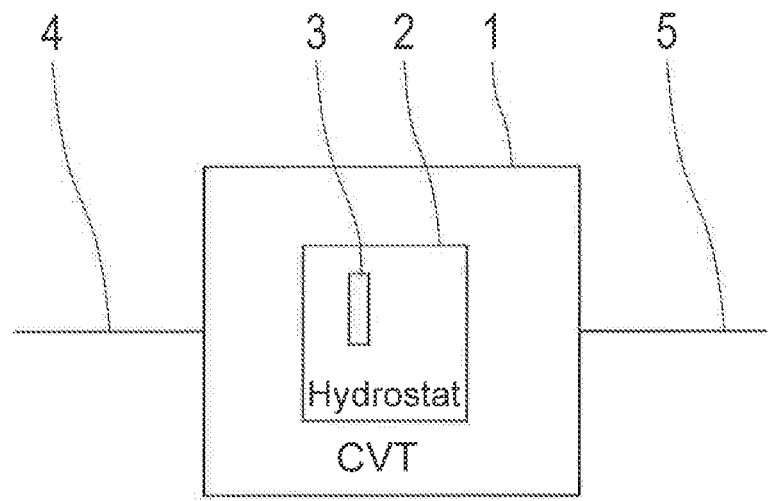
FIG. 1: A simplified schematic representation of a continuously variable transmission for a vehicle, which can be controlled by a method according to the invention.

FIG. 1 shows a continuously variable transmission 1 (CVT) for a vehicle—not shown here, wherein the continuously variable transmission 1 comprises a hydrostat 2 with a position-regulating valve 3. The continuously variable transmission 1 is in drive input connection with a drive input shaft 4, which is functionally connected to a drive engine—not shown here—in order to deliver drive power to the continuously variable transmission 1. In addition, the continuously variable transmission 1 is in drive output connection with a drive output shaft 5, the drive output shaft 5 being functionally connected to at least one drive axle—not shown here. When the position-regulating valve 3 is energized the hydrostat 2 is adjusted, in such manner that if the drive engine is operating at a substantially constant rotational speed and a force flow exists between the drive input shaft 4 and the drive output shaft 5, the vehicle accelerates. Not shown in FIG. 1 is a control unit which is in signal-transmitting connection with the transmission 1, the hydrostat 2 and the position-regulating valve 3. In addition the control unit can also be in signal-transmitting connection with further sensors (such as rotational speed sensors on the drive input shaft 4 or the drive output shaft 5, or on the accelerator pedal, etc.), or further control units (vehicle management computer, engine control unit, etc.).

FIGS. 2 to 5 show various example embodiments of the method according to the invention. Regardless of the particular example embodiment, the energization of the position-regulating valve 3 is monitored cyclically by a safety function. The safety function is provided in order to recognize an undesired energization of the position-regulating valve 3, which results in an unwanted acceleration of the vehicle, in order to then to separate the transmission 1 at least from the drive output shaft 5 and thereby to prevent an unwanted acceleration of the vehicle. The safety function is triggered when a variably selected limit value for the energization of the position-regulating valve 3 is exceeded.

Figure 2:
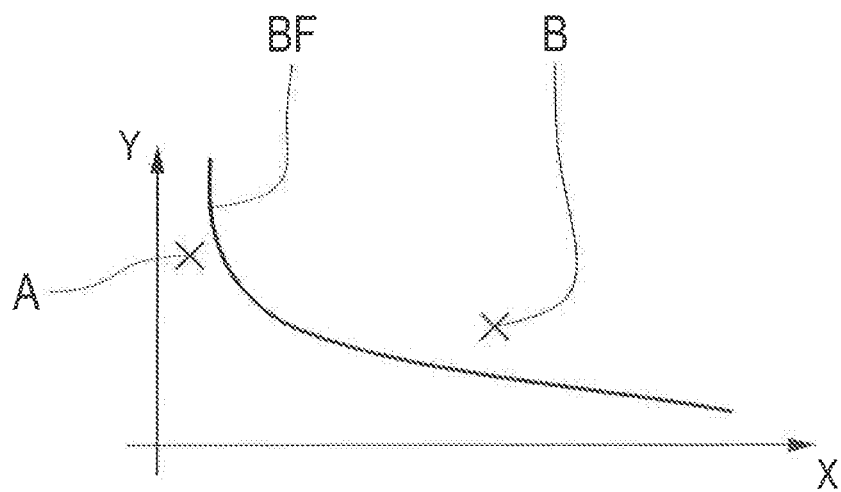
FIG. 2: A diagram to illustrate an evaluation function that can be parameterized, which can be used for a method according to the invention.

FIG. 2 shows the progression of an evaluation function BF that can be parameterized. The parameterized evaluation function BF is used to implement the method according to the invention. In the present case the parameterized evaluation function BF shows the limit value for the energization of the position-regulating valve 3 which, if exceeded, triggers the safety function. According to FIG. 2 the safety function, in particular the evaluation function BF, is used for monitoring unwanted accelerations of the vehicle during driving. Along the ordinate Y is plotted a current variation at the output of a control unit, whereas along the abscissa X is plotted the number of cycles. Thus, the energization of the position-regulating valve 3 is evaluated in terms of the average permitted current change at the control unit output. The maximum permitted current change at the control unit output depends on the number of cycles recently considered. The evaluation function BF indicates the maximum permitted deviation values as a function of the number of cycles.

For example, a value A does not trigger the safety function because it is in a permitted area below the evaluation function BF. In contrast, a value B does trigger the safety function because it is in a non-permitted area above the evaluation function BF. Owing to the inertia of the system a brief, high positive current change in the position-regulating valve 3 can only lead to a brief acceleration of the vehicle (value A). In contrast, a longer-lasting positive current change in the position-regulating valve 3 is more difficult for the driver to cope with, so that it is necessary to initiate the safety function (value B).

The current change from a preceding cycle to a present cycle and the sum of the current changes in a number of elapsed cycles are provided as input magnitudes of the parameterized evaluation function BF. The parameterized evaluation function is generated from a number of vehicle data and enables a good compromise between safety and robustness of the system. From the shape of the evaluation function it emerges that the average permitted current change depends on the number of cycles and decreases as the number of cycles increases.

For checking the permitted current values in the position-regulating valve 3 only those current values in the position-regulating valve 3 are taken into account which can physically lead to an acceleration of the vehicle. For example, in a first driving range a current change below an offset current of 300 mA is not taken into account if the energization increases from 75 mA to 250 mA within a few cycles. However, when it is found that the maximum current change has been exceeded, a threshold flag (marking signal) is set. When the threshold flag is set and the monitoring function is active, i.e. there is a force flow between the drive input shaft 4 and the drive output shaft 5 or at least there is a force flow between the transmission 1 and the drive output shaft 5, so that the internal rotational speeds in the transmission 1 must be above a limit value, then after a debouncing time that can be parameterized the transmission 1 is changed to a safer condition wherein the safety function is activated.

The initiation of a safer condition of the transmission 1 is understood to mean that the transmission 1 is separated at least from the drive output shaft 5 and preferably also from the drive input shaft 4, so that thereby undesired acceleration of the vehicle is prevented if unwanted energization of the position-regulating valve 3 takes place. In other words, such an initiation of the safer condition of the transmission 1 breaks the force connection between the drive input shaft 4 and the drive output shaft 5.

According to FIGS. 3, 4 and 5 the safety function is used for monitoring undesired starting of the vehicle, this start monitoring being activated if a rotational speed of the drive output shaft 5 is below a variably adjustable limit value and a force connection exists between the drive input shaft 4 and the drive output shaft 5.

Figure 3:
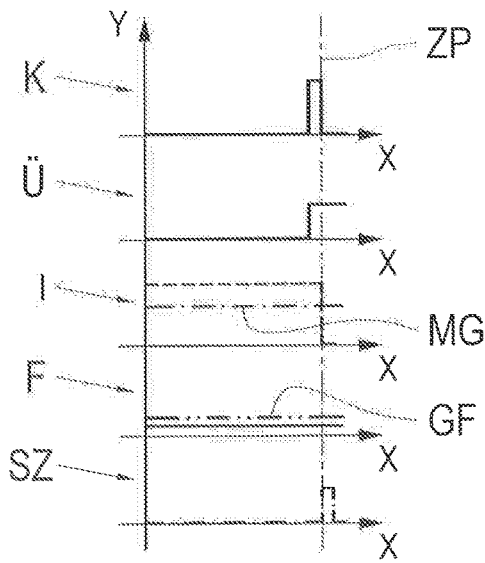
FIG. 3: A diagram to illustrate an example progression of a method according to the invention.
Figure 4:
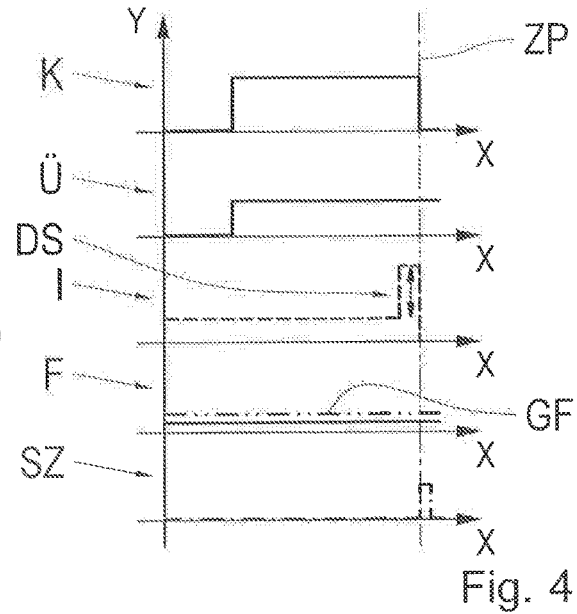
FIG. 4: Another diagram to illustrate an example progression of a method according to the invention.

In FIGS. 3 and 4, in each case five diagrams are integrated in a common diagram. On the abscissa X in each case a time is plotted. On the other hand, along the ordinate Y, from the bottom upward, first the initiation of a safer condition SZ of the transmission 1 is shown, then an accelerator pedal position F, then an electric current strength I, then an activity of the start monitoring Ü, and finally the existence of a force connection K between the drive input shaft 4 and the drive output shaft 5.

In FIG. 3 the safety function is triggered when a maximum limit value MG for the energization of the position-regulating valve 3 is exceeded and at the same time a limit value GF for an accelerator pedal position has not been exceeded. Since the start monitoring Ü is only active from the time when the force connection K between the drive input shaft 4 and the drive output shaft 5 was established, the safety function is triggered shortly thereafter at time ZP and after a few cycles the safer condition SZ of the transmission 1 is initiated.

According to FIG. 4, the safety function is triggered when a maximum differential current value DS for the energization of the position-regulating valve 3 is exceeded. In this case the maximum differential current value DS is shown by the sudden increase of the energization of the position-regulating valve 3.

Figure 5:
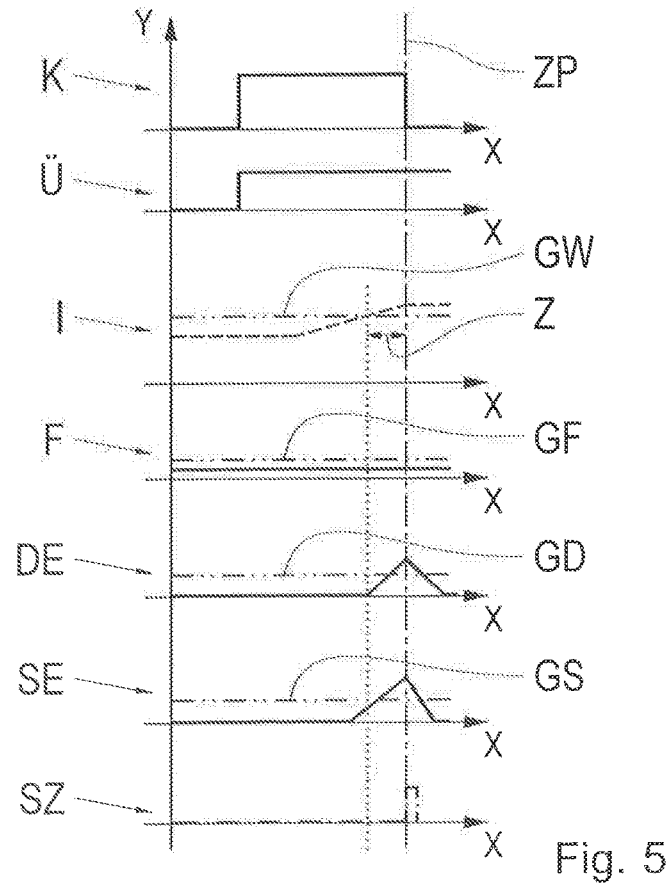
FIG. 5: A further diagram to illustrate an example progression of a method according to the invention.

FIG. 5 combines seven diagrams in a common diagram. On the abscissa in each case is plotted the time. On the other hand along the ordinate Y, from the bottom upward, is shown first the initiation of the safer condition SZ of the transmission 1, then a voltage SE for recognizing movement of the drive output shaft 5, then a rotational speed DE for recognizing movement of the drive output shaft 5, then the accelerator pedal position F, then the electric current strength I, then the activity of the start monitoring Ü and finally the existence of the force connection K between the drive input shaft 4 and the drive output shaft 5.

According to FIG. 5, when a limit value GW for the energization of the position-regulating valve 3 is exceeded, an undesired start of the vehicle is recognized. From that time onward a counter Z is started, and the safety function is triggered when the counter has Z run down and the limit value GW for the current in the position-regulating valve 3 is still exceeded, and at the same time a limit value for an accelerator pedal position GF is not exceeded, the voltage SE for recognizing a movement at the drive output shaft 5 is above a limit value GS, and a rotational speed DE for recognizing a movement at the drive output shaft 5 is above a limit value GD. Consequently the running down of the counter Z is the time-point ZP at which the safety function is triggered and, after a few cycles, the safer condition SZ of the transmission 1 is also initiated.

INDEXES

1 Continuously variable transmission
2 Hydrostat
3 Position-regulating valve
4 Drive input shaft
5 Drive output shaft
A, B Value
I Electric current strength
F Accelerator pedal position
Ü Activity of the start monitoring
K Presence of a force connection
X Abscissa
Y Ordinate
Z Counter
BF Parameterized evaluation function
MG Maximum limit value for an energization of the position-regulating valve
DS Maximum differential current value for energization of the position-regulating valve
DE Rotational speed for recognizing a movement at the drive output shaft
GD Limit value for recognizing a movement at the drive output shaft
GS Limit value for recognizing a movement at the drive output shaft
GW Limit value for the energization of the position-regulating valve
GF Limit value for an accelerator pedal position
SE Voltage for recognizing a movement at the drive output shaft
SZ Initiation of a safer condition
ZP Time-point for triggering the safety function

The invention claimed is:

1. A method of controlling a continuously variable transmission for a vehicle, the continuously variable transmission having a hydrostat with a position-regulating valve and being designed to co-operate in driving connection with a drive input shaft and a drive output shaft, and when the position-regulating valve is energized, the hydrostat being adjusted in order to accelerate the vehicle, the method comprising:
   cyclically monitoring energization of the position-regulating valve by a safety function, and the safety function being provided to recognize undesired energization of the position-regulating valve, that leads to unwanted acceleration of the vehicle, and separate the continuously variable transmission from at least the drive output shaft and thereby preventing unwanted acceleration of the vehicle; and
   triggering the safety function at least when a limit value for the energization of the position-regulating valve is exceeded.

2. The method according to claim 1, further comprising using the safety function for monitoring unwanted starting of the vehicle, the monitoring of unwanted starting of the vehicle being activated when a rotational speed of the drive output shaft is below a variably adjustable limit value and a force connection exists between the drive input shaft and the drive output shaft.

3. The method according to claim 2, further comprising deactivating the monitoring of unwanted starting of the vehicle if a limit value for an accelerator pedal position is exceeded.

4. The method according to claim 3, further comprising triggering the safety function if a maximum limit value for the energization of the position-regulating valve is exceeded.

5. The method according to claim 3, further comprising triggering the safety function if a maximum differential current value for the energization of the position-regulating valve is exceeded.

6. The method according to claim 5, further comprising
   recognizing an undesired start, if a limit value for the energization of the position-regulating valve is exceeded without reaching the maximum differential current value,
   starting a counter, and
   triggering the safety function when the counter runs down and the limit value, for a current value in the position-regulating valve, is still exceeded.

7. The method according to claim 6, further comprising monitoring at least the rotational speed at the drive output shaft while the counter is running down, and triggering the safety function after the counter runs down and at least the rotational speed at the drive output shaft exceeds a limit value.

8. The method according to claim 1, further comprising using the safety function to monitor unwanted accelerations of the vehicle during driving, the monitoring of unwanted accelerations of the vehicle comprising an evaluation function that can be parameterized such that a current change from a preceding cycle to a present cycle and a sum of the current changes in a number of elapsed cycles are provided as input magnitudes.

9. The method according to claim 8, further comprising generating the parameterized evaluation function from a number of vehicle data.

10. The method according to claim 8, further comprising defining an the average permitted current change as dependent on the number of cycles and the average permitted current change decreases as the number of cycles increases.

11. A control unit for implementing a method for controlling a continuously variable transmission for a vehicle, the continuously variable transmission having a hydrostat with a position-regulating valve and being designed to co-operate in driving connection with a drive input shaft and a drive output shaft, and when the position-regulating valve is energized, the hydrostat being adjusted in order to accelerate the vehicle, the control unit cyclically monitoring energization of the position-regulating valve by a safety function, the safety function being provided to recognize undesired energization of the position-regulating valve, that leads to unwanted acceleration of the vehicle, and separate the continuously variable transmission at least from the drive output shaft and thereby preventing unwanted acceleration of the vehicle; and triggering the safety function at least when a limit value for the energization of the position-regulating valve is exceeded.

12. A method of controlling a continuously variable transmission of a vehicle, the continuously variable transmission having a hydrostat with a position-regulating valve, and being designed to co-operate in driving connection with a drive input shaft and a drive output shaft, a control unit being in signal-transmission connection with the continuously variable transmission, the hydrostat and the position-regulating valve, and the vehicle being accelerated by adjustment of the hydrostat which is adjustable by energization of the position-regulating valve, the method comprising:

implementing control of the continuously variable transmission with the control unit;

cyclically monitoring, with a safety function, the energization of the position-regulating valve;

recognizing, via the safety function, undesired energization of the position-regulating valve which leads to unwanted acceleration of the vehicle;

separating the driving connection, between the continuously variable transmission and at least the drive output shaft, for preventing the unwanted acceleration of the vehicle; and triggering the safety function at least when a value of energization of the position-regulating valve exceeds a limit value of energization of the position-regulating valve.

13. The method according to claim 12, further comprising:

monitoring, using the safety function, unwanted starting of the vehicle;

activating monitoring of the unwanted starting of the vehicle when:
 a rotational speed value of the drive output shaft is below a variably adjustable rotational speed limit value of the drive output shaft, and
 a force connection exists between the drive input shaft and the drive output shaft.

14. The method according to claim 13, further comprising deactivating the monitoring of the unwanted starting of the vehicle if an accelerator pedal position value exceeds a limit value of the accelerator pedal position.

15. The method according to claim14, further comprising triggering the safety function if the value of energization of the position-regulating valve exceeds a maximum limit value of the energization of the position-regulating valve.

16. The method according to claim 14, further comprising triggering the safety function if a differential current value for the energization of the position-regulating valve exceeds a maximum differential current value for the energization of the position-regulating valve.

* * * * *